United States Patent
Asai et al.

(10) Patent No.: US 10,465,800 B2
(45) Date of Patent: Nov. 5, 2019

(54) VALVE DEVICE WITH AXIS THROUGH ITS TUBULAR PORTION

(71) Applicant: FUTABA INDUSTRIAL CO., LTD., Aichi (JP)

(72) Inventors: Ryuji Asai, Aichi (JP); Hirohisa Okami, Aichi (JP)

(73) Assignee: FUTABA INDUSTRIAL CO., LTD., Aichi (JP)

( * ) Notice: Subject to any disclaimer, the term of this patent is extended or adjusted under 35 U.S.C. 154(b) by 0 days.

(21) Appl. No.: 15/761,312

(22) PCT Filed: Jan. 22, 2016

(86) PCT No.: PCT/JP2016/051919
§ 371 (c)(1),
(2) Date: Mar. 19, 2018

(87) PCT Pub. No.: WO2017/126123
PCT Pub. Date: Jul. 27, 2017

(65) Prior Publication Data
US 2018/0299016 A1    Oct. 18, 2018

(51) Int. Cl.
*F16K 1/20* (2006.01)
*F16K 1/16* (2006.01)
(Continued)

(52) U.S. Cl.
CPC .............. *F16K 1/2007* (2013.01); *F01N 5/02* (2013.01); *F01N 13/082* (2013.01); *F16K 1/16* (2013.01);
(Continued)

(58) Field of Classification Search
CPC ...... F16K 1/2007; F16K 27/0227; F16K 1/16; F01N 13/082; F01N 5/02; F01N 2240/02; F01N 2240/36; Y02T 10/16
(Continued)

(56) References Cited

U.S. PATENT DOCUMENTS 3,522,929 A * 8/1970 De Simone ........... F01D 17/148
251/298
8,118,007 B2   2/2012 Sano
(Continued)

FOREIGN PATENT DOCUMENTS

CN    104395569 A    3/2015
CN    104541031 A    4/2015
(Continued)

OTHER PUBLICATIONS

International Preliminary Report on Palatability dated Jul. 24, 2018, and English translation of the Written Opinion of he International Searching Authority dated Apr. 19, 2016 for corresponding International Application No. PCT/JP2016/051919, filed Jan. 22, 2016.
(Continued)

*Primary Examiner* — John Bastianelli
(74) *Attorney, Agent, or Firm* — David D. Brush; Westman, Champlin & Koehler, P.A.

(57) ABSTRACT

A valve device opens/closes an opening that is located at an end portion of a flow path and whose shape is a point symmetrical or substantially point symmetrical planar figure. The valve device includes a lid portion closing the opening and an arm portion rotating the lid portion about an axis to open/close the opening. A straight line passing through the center of the opening and orthogonal to the opening is taken as a center line. The axis is a straight line intersecting the flow path without intersecting the center line. When closing the opening, the arm portion rotates the lid portion toward the center line, and when opening the opening, the arm portion rotates the lid portion to the opposite side of the center line.

12 Claims, 2 Drawing Sheets

(51) Int. Cl.
  *F01N 5/02*      (2006.01)
  *F01N 13/08*     (2010.01)
  *F16K 27/02*     (2006.01)
(52) U.S. Cl.
  CPC ...... *F16K 27/0227* (2013.01); *F01N 2240/02* (2013.01); *F01N 2240/36* (2013.01); *Y02T 10/16* (2013.01)
(58) Field of Classification Search
  USPC .................................................. 251/339, 298
  See application file for complete search history.

(56) References Cited

U.S. PATENT DOCUMENTS

| | | | |
|---|---|---|---|
| 8,893,485 B2 | 11/2014 | Hisanaga et al. | |
| 2002/0020826 A1* | 2/2002 | Erichsen | F16K 11/052 251/62 |
| 2008/0029655 A1* | 2/2008 | Mabuchi | F01N 5/02 248/58 |
| 2010/0043413 A1* | 2/2010 | Orihashi | F01N 3/02 60/320 |
| 2010/0251987 A1 | 10/2010 | Sano | |
| 2012/0297754 A1* | 11/2012 | Hisanaga | F01N 5/02 60/320 |
| 2013/0299004 A1 | 11/2013 | Abram | |
| 2014/0352286 A1 | 12/2014 | Kato et al. | |
| 2015/0013789 A1 | 6/2015 | Hodebourg et al. | |
| 2015/0184571 A1* | 7/2015 | Kobayashi | F01N 5/02 165/41 |
| 2015/0218997 A1* | 8/2015 | Kato | F01N 5/02 165/103 |

FOREIGN PATENT DOCUMENTS

| | | |
|---|---|---|
| JP | H0821535 A | 1/1996 |
| JP | 2006275081 A | 10/2006 |
| JP | 2008014295 A | 1/2008 |
| JP | 2010242618 A | 10/2010 |
| JP | 2011144861 A | 7/2011 |
| JP | 2012246835 A | 12/2012 |
| JP | 2013130159 A | 7/2013 |
| JP | 2015513037 A | 4/2015 |
| JP | 2015158192 A | 9/2015 |
| WO | WO 2014025036 A1 * | 2/2014 |

OTHER PUBLICATIONS

International Search Report dated Apr. 8, 2016 for corresponding International Application No. PCT/JP2016/051919, filed Jan. 22, 2016.

Written Opinion of the International Searching Authority dated Apr. 8, 2016 for corresponding International Application No. PCT/JP2016/051919, filed Jan. 22, 2016.

English translation of the Notification or Reasons for Refusal dated Dec. 11, 2018 for corresponding Japanese Application No. 2017-562413.

English translation of Office Action dated Dec. 18, 2018 for corresponding Chinese Application No. 201680052195.1.

English translation of the Notification of Reasons for Refusal dated Jun. 11, 2019 for corresponding Japanese Application No. 2017-562413.

English translation of the Chinese Office Action dated Jun. 24, 2019 for corresponding Chinese Application No. 201680052195.1.

* cited by examiner

VALVE DEVICE WITH AXIS THROUGH ITS TUBULAR PORTION

This Application is a Section 371 National Stage Application of International Application No. PCT/JP2016/051919, filed Jan. 22, 2016, the content of which is incorporated herein by reference in its entirety, and published as WO 2017/126123 on Jul. 27, 2017, not in English.

TECHNICAL FIELD

The present disclosure relates to a valve device.

BACKGROUND ART

In the valve devices (hereinafter referred to as swing valves) of Patent Documents 1 and 2, an axis is provided that passes through a lateral side of an opening of a discharge pipe and is parallel to the opening. The swing valve rotates a lid portion about the axis to open/close the opening. At this time, an end portion of the lid portion rotates so as to draw an arc toward the downstream side of the opening.

Thus, in the swing valve, a hangover is increased. The hangover is the degree to which a trajectory of the lid portion opening/closing the opening projects toward the downstream side of the opening. That is, a space required for opening/closing the opening increases. In addition, a force required for opening/closing the opening increases. There has been known a phenomenon called chattering in which during closing of the opening, the lid portion opens/closes the opening due to an increase or decrease in air pressure inside the exhaust pipe. In the swing valve, a large force is applied to the lid portion when the opening is closed. Thus, abnormal noise generated by collision of the lid portion with the exhaust pipe at the time of occurrence of chattering increases.

PRIOR ART DOCUMENTS

Patent Documents

Patent Document 1: Japanese Unexamined Patent Application Publication No. 2012-246835
Patent Document 2: Japanese Unexamined Patent Application Publication No. 2015-158192

SUMMARY OF THE INVENTION

Problems to be Solved by the Invention

On the other hand, a valve device (hereinafter referred to as a butterfly valve) having an axis crossing an opening has been known. The butterfly valve rotates a lid portion about the axis to open/close an opening of an exhaust pipe. For this reason, the butterfly valve has a smaller hangover than the swing valve. In addition, in the butterfly valve, the force required for opening/closing the opening is smaller than that in the swing valve. As a result, abnormal noise at the time of occurrence of chattering is reduced.

However, in the butterfly valve, when the opening is opened, the lid portion is located on a flow path for exhaust gas. For this reason, the flow of the exhaust gas is hindered. Further, in the butterfly valve, when the opening is closed, an outer edge of the lid portion is adjacent to an inner wall of the exhaust pipe. Thus, if the precision of the shapes of the lid portion and the exhaust pipe is low, the sealing property (in other words, the sealability) of the opening at the time of closing may be impaired.

In one aspect of the present disclosure, it is desirable to provide a valve device that is easily disposed while well opening/closing an opening.

Means for Solving the Problems

A valve device according to one aspect of the present disclosure opens/closes an opening that is located at an end portion of a flow path and whose shape is a point symmetrical or substantially point symmetrical planar figure. The valve device comprises a lid portion and an arm portion. The lid portion closes the opening. The arm portion rotates the lid portion about the axis to open/close the opening. A straight line passing through the center of the opening and orthogonal to the opening is taken as a center line. The axis is a straight line intersecting the flow path without intersecting the center line. When closing the opening, the arm portion rotates the lid portion toward the center line, and when opening the opening, the arm portion rotates the lid portion to the opposite side of the center line.

According to such a configuration, when the opening is opened/closed, the lid portion can be moved so as to be displaced along the opening while facing the opening. Thus, a hangover can be suppressed. When the lid portion is rotated to the opposite side of the center line, the lid portion can reach a lateral side of the flow path. That is, when the opening is opened, the lid portion can be accommodated laterally of the opening. Accordingly, it is possible to suppress a space required on the downstream side of the opening for opening/closing the opening. Thus, arrangement of the valve device becomes easy.

On the other hand, when the opening is closed, the lid portion presses the opening from the downstream side. Thus, the sealing property of the opening at the time of closing is improved. On the other hand, when the opening is opened, the lid portion is located laterally of the opening. Thus, the lid can be prevented from hindering a flow of a fluid passing through the opening. In addition, the axis can be disposed near the lid portion. Thus, it is possible to suppress a force required for rotating the lid portion (in other words, a force required for opening/closing the opening). As a result, it is possible to suppress abnormal noise at the time of occurrence of chattering.

Accordingly, the valve device can be easily disposed while well opening/closing the opening.

In the present disclosure, a plane parallel to the center line and including the axis is a reference plane, and an application point of a force applied from the arm portion to the lid portion in order to rotate the lid portion located at a position where the opening is closed may be located on the center line side with respect to the reference plane.

According to such a configuration, when the pressure in the flow path whose opening is closed by the lid portion rises, a force for rotating the lid portion toward the opposite side of the center line acts on the lid portion. That is, when the pressure in the flow path rises during closing of the opening, the opening is opened. Thus, the valve device can function as a safety valve.

In the present disclosure, a plane parallel to the center line and including the axis is a reference plane, and an application point of a force applied from the arm portion to the lid portion in order to rotate the lid portion located at a position where the opening is closed may be located on the reference plane.

According to such a configuration, even if the pressure in the flow path whose opening is closed by the lid portion rises, the force for rotating the lid portion does not occur. Thus, when the pressure in the flow path rises during closing of the opening, it is easy to maintain the closed state of the opening. Accordingly, the sealing property at the time of closing the opening is improved.

In the present disclosure, a plane parallel to the center line and including the axis is a reference plane, and an application point of a force applied from the arm portion to the lid portion in order to rotate the lid portion located at a position where the opening is closed may be located on the opposite side of the center line with respect to the reference plane.

According to such a configuration, when the pressure in the flow path whose opening is closed by the lid portion rises, a force for rotating the lid portion toward the center line acts on the lid portion. That is, when the pressure in the flow path rises during closing of the opening, the opening is closed more strongly. Accordingly, the sealing property at the time of closing the opening is further improved.

In the present disclosure, a section comprising the end portion of the flow path is an end section, the end section is a section extending in a predetermined end direction, and the opening may be directed toward the end direction. A heat exchanger that transmits heat of a moving fluid, which is a fluid flowing down through the flow path, to another fluid is provided laterally of a section on the upstream side of the end section, and when the lid portion closes the opening, the moving fluid flows out laterally of the flow path from an opening portion provided on the upstream side of the opening, and the moving fluid may move toward the heat exchanger.

According to such a configuration, when the lid portion is rotated to the opposite side of the center line, the lid portion is disposed in a space provided laterally of the end section in the flow path and on the downstream side of the heat exchanger. Thus, it is possible to effectively utilize a space around the opening of the flow path.

EXPLANATION OF REFERENCE NUMERALS

1 . . . exhaust heat recovery device, 10 . . . valve device, 11 . . . valve body, 12 . . . arm member, 12a, 12b, 12c . . . connection position, 13 . . . shaft portion, 13a . . . first shaft portion, 13b . . . second shaft portion, 13c . . . axis, 13d . . . reference plane, 20 . . . exhaust pipe, 21 . . . outlet, 30 . . . lid member, 40 . . . heat exchange chamber, 41 . . . heat exchanger, 42 . . . inflow route, 43 . . . outlet, 50 . . . partition member, 51 . . . cylindrical portion, 52 . . . partition portion, 53 . . . outlet, 53a . . . center line, 54 . . . wire mesh, 60 . . . shell member

MODE FOR CARRYING OUT THE INVENTION

Hereinafter, an embodiment of the present disclosure will be described with reference to the drawings. The embodiments of the present disclosure are not limited to the following embodiments, but may have various modes as far as the modes are within the technical scope of the present disclosure.

[Explanation of Overall Configuration]

Figure 1A:
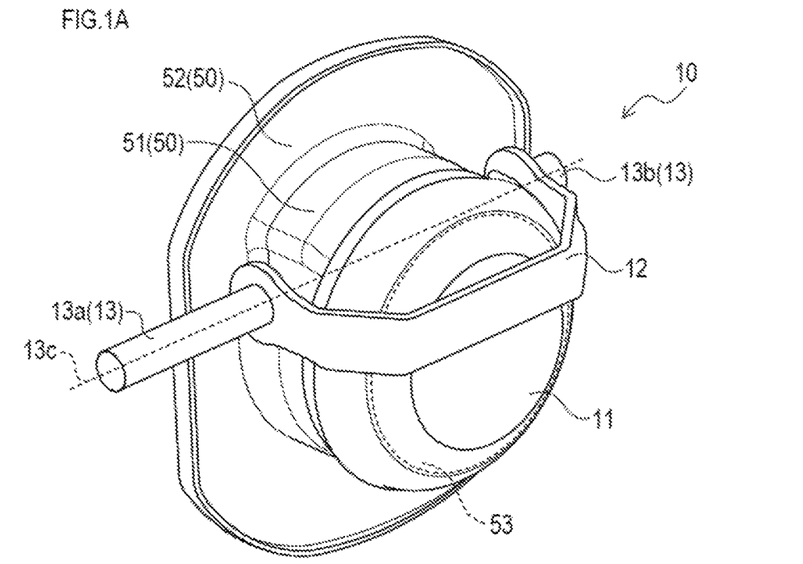
FIG. 1A is a perspective view of a valve device of the present embodiment.
Figure 1B:
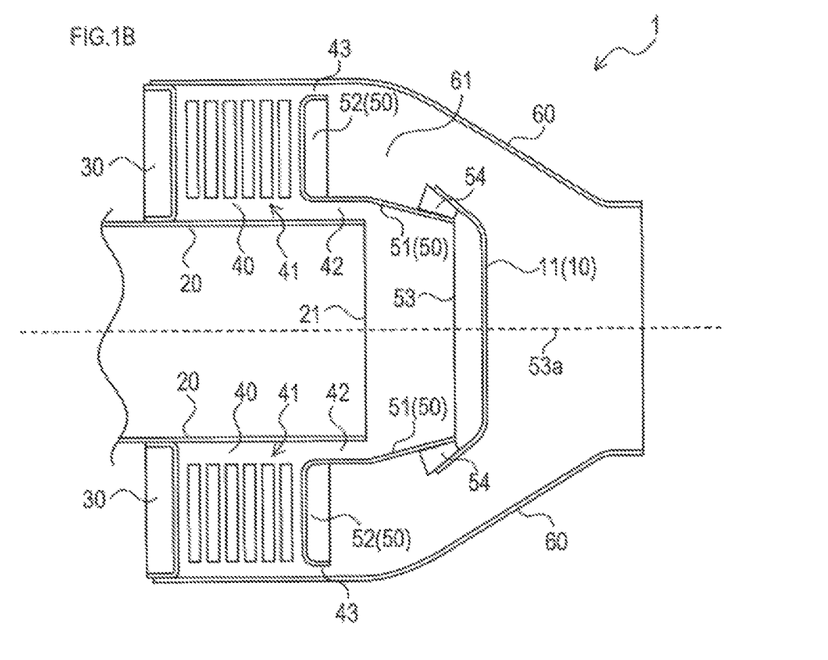
FIG. 1B is a side cross-sectional view of an exhaust pipe, a heat exchange chamber, a heat exchanger, a partitioning member, the valve device in a closed state, a shell member, and so on in an exhaust heat recovery device of the present embodiment.
Figure 2A:
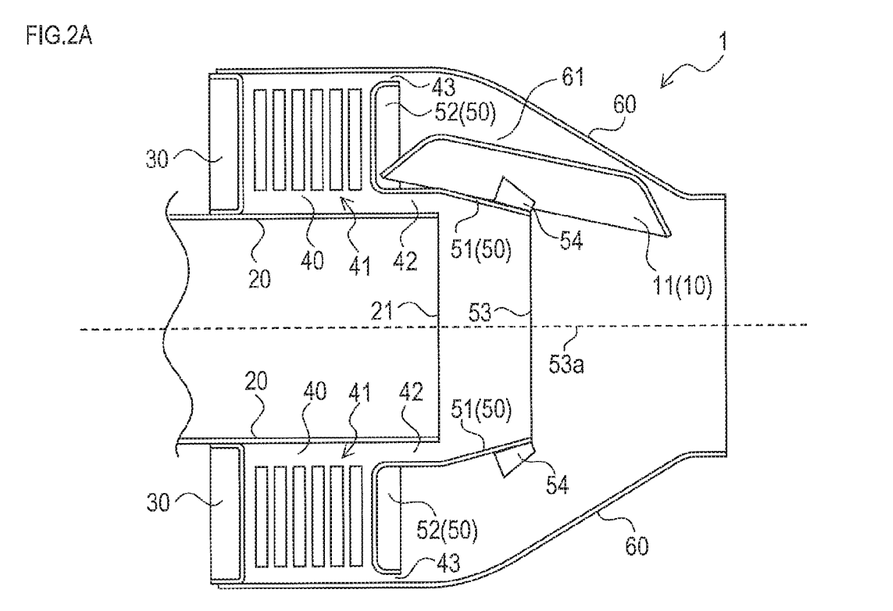
FIG. 2A is a side cross-sectional view of the exhaust pipe, the heat exchange chamber, the heat exchanger, the partitioning member, the valve device in an open state, the shell member, and so on in the exhaust heat recovery device of the present embodiment.

A valve device 10 of the present embodiment is provided in an exhaust heat recovery device 1 (FIG. 1A). The exhaust heat recovery device 1 is installed in, for example, a moving object such as a vehicle having an engine (FIGS. 1B and 2A). The exhaust heat recovery device 1 is disposed in an exhaust gas flow path, which is a flow path for exhaust gas of an engine or the like. Hereinafter, the upstream side of the exhaust gas flow path is simply referred to as the upstream side, and the downstream side of the exhaust gas flow path is simply referred to as the downstream side. In the exhaust heat recovery device 1, heat exchange is carried out between the exhaust gas, which is a high temperature fluid, and a coolant of the engine. That is, heat of the exhaust gas is transmitted to the coolant of the engine. As a result, heat is recovered from the exhaust gas. The coolant may be, for example, a cooling water or oil liquid.

The exhaust heat recovery device 1 has a valve device 10, an exhaust pipe 20, a lid member 30, a heat exchange chamber 40, a partition member 50, a shell member 60, and the like.

The exhaust pipe 20 is a cylindrical member with both ends opened. The exhaust pipe 20 extends downstream. A space inside the exhaust pipe 20 serves as a flow path for exhaust gas. An upstream opening of the exhaust pipe 20 is connected to an exhaust manifold or the like. The exhaust manifold is a member into which the exhaust gas from the engine flows.

The shell member 60 is a cylindrical member with both ends opened. The shell member 60 extends downstream. The shell member 60 covers a section comprising a downstream opening (hereinafter referred to as an outlet 21) of the exhaust pipe 20 from the side. The exhaust pipe 20 is disposed so as to project upstream from an upstream opening of the shell member 60. There is a gap between the exhaust pipe 20 and a side surface of the shell member 60. In a space inside the shell member 60, the valve device 10, the exhaust pipe 20, the heat exchange chamber 40, the partition member 50, and the like are arranged.

The lid member 30 is a plate-like member blocking a gap between the shell member 60 and the exhaust pipe 20 at the upstream opening of the shell member 60. The shape of the lid member 30 is annular.

The heat exchange chamber 40 is an annular space surrounding a lateral side of the exhaust pipe 20. The heat exchange chamber 40 is a space surrounded by the lid member 30, the exhaust pipe 20, the shell member 60, a partition portion 52 (details will be described below) of the partition member 50, and so on. In the heat exchange chamber 40, a heat exchanger 41 is disposed.

The heat exchanger 41 has a plurality of flat plates. These plates are stacked along the exhaust pipe 20 while having a gap (in other words, the plates are arranged in an overlapped manner). The plate is an annular member. The plates are arranged so as to surround the lateral side of the exhaust pipe 20. The plate comprises a heat exchange flow path, which is a flow path for the coolant.

The heat exchange chamber 40 may have a shape other than an annular shape. Similarly, the heat exchanger 41 may have various shapes according to the shape of the heat exchange chamber 40.

The partition member 50 surrounds a portion around the outlet 21 of the exhaust pipe 20 from the side. The partition member 50 has a cylindrical portion 51, the partition portion 52, and so on.

The cylindrical portion 51 is a cylindrical portion. The cylindrical portion 51 covers a portion around the outlet 21 of the exhaust pipe 20 and a space on the downstream side of the outlet 21 from the side. The cylindrical portion 51 is disposed so as to have a gap between the cylindrical portion 51 and the side surface of the exhaust pipe 20. The gap serves as an inflow route 42 to the heat exchange chamber 40. The inflow route 42 is disposed so as to surround the outlet 21 of the exhaust pipe 20 and a side surface around the outlet 21 of the exhaust pipe 20. A downstream opening (hereinafter referred to as an outlet 53) of the cylindrical portion 51 is opened/closed by the valve body 11 of the valve device 10. The outlet 53 is located at an end of the cylindrical portion 51.

The shape of the outlet 53 is a point symmetrical or substantially point symmetrical planar figure. As an example, in the present embodiment, the outlet 53 may be circular. The shape of the outlet 53 is not limited to a circle. The shape of the outlet 53 may be an oval shape or a point-symmetrical polygon. Further, the shape of the outlet 53 may be a substantially point-symmetrical shape such as a substantially circular shape or a substantially elliptical shape. In the present embodiment, as an example, a direction of the outlet 53 is orthogonal to a direction of the flow path for exhaust gas inside the cylindrical portion 51 and the exhaust pipe 20. However, the direction of the outlet 53 may not be orthogonal to the direction of the flow path.

A buffer member 54 is disposed around the outlet 53 so as to surround the outlet 53. The buffer member 54 alleviates the impact when the valve body 11 closes the outlet 53. The buffer member 54 may be a wire mesh, for example. The wire mesh is a member formed by weaving a wire-like member made of metal such as stainless steel. The cylindrical portion 51 is disposed with a gap (hereinafter referred to as an outlet space 61) between the cylindrical portion 51 and inside of the side surface of the shell member 60. In the outlet space 61, the valve body 11 is disposed when the valve device 10 opens the outlet 53.

The partition portion 52 is a flange-like portion located at an end on the upstream side of the cylindrical portion 51. In other words, the partition portion 52 is a plate-like portion projecting laterally from an outer edge of an upstream opening of the cylindrical portion 51. Further, the partition portion 52 is an annular portion surrounding a circumference of the upstream opening of the cylindrical portion 51. The partition portion 52 covers an end on the downstream side of the heat exchange chamber 40. There is a gap between an edge portion forming an outer circumference of the partition portion 52 and the inside of the side surface of the shell member 60. The gap serves as an outlet 43 for exhaust gas from the heat exchange chamber 40. The outlet 43 is disposed along the inside of the side surface of the shell member 60 so as to surround the exhaust pipe 20, the partition member 50, and so on.

A space inside the exhaust pipe 20 and the cylindrical portion 51 serves as a flow path for exhaust gas flowing toward the downstream side. When the outlet 53 of the cylindrical portion 51 is closed by the valve body 11 of the valve device 10, heat exchange is carried out with the coolant for the exhaust gas.

Specifically, in the heat exchanger 41, cooling water flows into the heat exchange flow path of each plate from the flow path for the cooling water connected to the engine or the like. The cooling water flows down through the heat exchange flow path of each plate and then flows out to the flow path for the cooling water.

On the other hand, when the exhaust gas flowing down through the exhaust pipe 20 reaches the outlet 53, the exhaust gas collides with the valve body 11, closing the outlet 53, and moves to the upstream side. Then, the exhaust gas flows into the inflow route 42 to the heat exchange chamber 40. After that, the exhaust gas passes through the inflow route 42 and flows into the heat exchange chamber 40. In the heat exchange chamber 40, the exhaust gas comes into contact with the plate of the heat exchanger 41. As a result, the heat of the exhaust gas is transmitted to the coolant. After that, the exhaust gas flows out of the heat exchange chamber 40 through the outlet 43. Then, the exhaust gas flows down toward the downstream side and flows out to the outside from an opening (hereinafter referred to as an outlet) on the downstream side of the shell member 60.

On the other hand, when the outlet 53 is opened by the valve device 10, heat exchange is not carried out with the coolant for the exhaust gas. In this case, the exhaust gas flowing down through the exhaust pipe 20 passes through the outlet 53. Then, the exhaust gas flows out to the outside from the outlet of the shell member 60.

[Description of Valve Device]

Next, the valve device 10 of the present embodiment will be described in detail, The valve device 10 has a valve body 11, an arm member 12, a shaft portion 13, and so on.

The valve body 11 is a flat lid-like member closing the outlet 53 of the cylindrical portion 51. The valve body 11 is displaced to a closed position (FIG. 1B) where the outlet 53 is closed and an open position (FIG. 2A) where the outlet 53 is opened.

The shaft portion 13 has a first shaft portion 13a and a second shaft portion 13b which are two columnar portions. The first shaft portion 13a and the second shaft portion 13b rotate about an axis 13c. The first shaft portion 13a and the second shaft portion 13b are arranged on a lateral side of the cylindrical portion 51 so as to sandwich the cylindrical portion 51 therebetween. The first shaft portion 13a and the second shaft portion 13b are arranged so as to project laterally from a side surface of the cylindrical portion 51. That is, the first shaft portion 13a and the second shaft portion 13b are not arranged inside the cylindrical portion 51. Further, the first shaft portion 13a and the second shaft portion 13b extend on the axis 13c. That is, the first shaft portion 13a and the second shaft portion 13b are aligned on the axis 13e.

Here, a straight line passing through the center of the outlet 53 is taken as a center line 53a. The center line 53a is orthogonal to the outlet 53. As described above, the shape of the outlet 53 is point symmetrical or substantially point symmetrical. It is assumed that a point symmetrical planar figure is rotated by 180° about a symmetric point. At this time, the planar figure after rotation completely overlaps the planar figure before rotation. When the shape of the outlet 53 is a point symmetrical planar figure, a symmetric point of the planar figure is the center of the outlet 53. Specifically, for example, when the outlet 53 is circular, a straight line passing through the center of the circle is the center line 53a.

When the shape of the outlet 53 is a substantially point symmetrical planar figure, a symmetric point of a point symmetrical planar figure approximate or similar to the substantially point symmetrical planar figure may be used as the center of the outlet 53. Specifically, when the point symmetrical planar figure is disposed along an edge of the outlet 53, a point overlapping the symmetric point of the planar figure may be used as the center of the outlet 53.

Figure 2B:
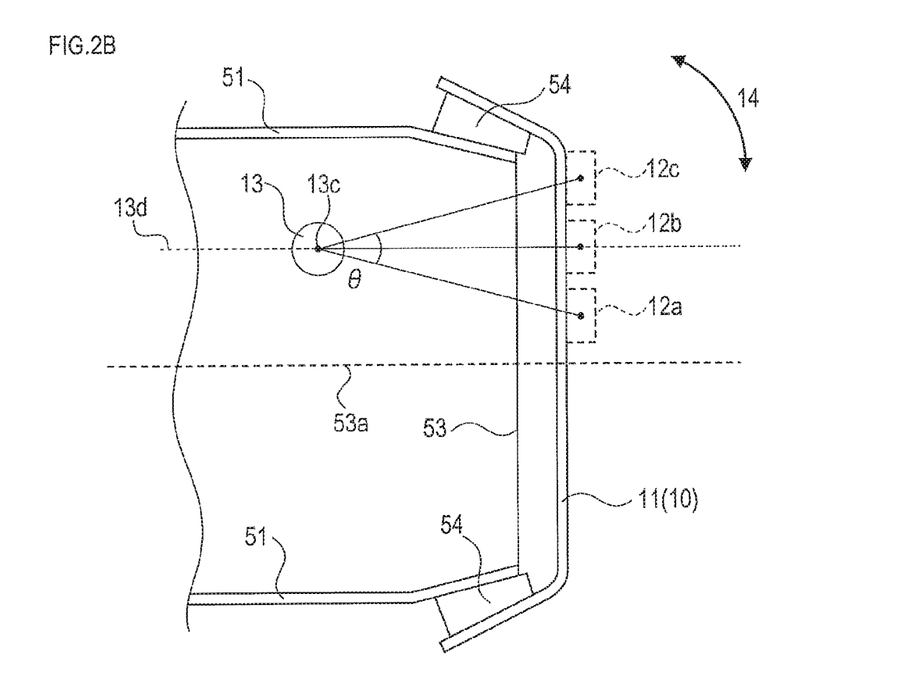
FIG. 2B is a side cross-sectional view of the partitioning member and the valve device in the exhaust heat recovery device of the present embodiment.

The axis 13c is a straight line passing through the side surface of the cylindrical portion 51 (in other words, the flow path for exhaust gas inside the cylindrical portion 51). The axis 13c does not intersect the center line 53a. In other words, the axis 13c is disposed at a predetermined distance apart from the center line 53a toward the lateral side of the cylindrical portion 51 (FIG. 2B). In the present embodiment, as an example, the axis 13c is parallel to the outlet 53. However, the axis 13c may be substantially parallel to the outlet 53. The axis 13c may not be parallel to the outlet 53.

The arm member 12 is an elongated member connecting the valve body 11 to the first shaft portion 13a and the second shaft portion 13b. One end of the arm member 12 is connected to an end portion of the first shaft portion 13a on the cylindrical portion 51 side. The other end of the arm member 12 is connected to an end portion of the second shaft portion 13h on the cylindrical portion 51 side. The arm member 12 is connected to an outer surface of the valve body 11. The outer surface of the valve body 11 is a surface facing the downstream side when the valve element 11 closes the outlet 53. The arm member 12 is disposed so as to cross the outer surface. A portion (hereinafter referred to as a connecting portion) connected to the outer surface of the valve body 11 in the arm member 12 extends along the axis 13c.

Here, the position of the connecting portion of the arm member 12 will be described in detail. When the first shaft portion 13a and the second shaft portion 13b rotate, the arm member 12 rotates to the center line 53a side or the opposite side of the center line 53a. At this time, the valve body 11 rotates to the center line 53a side or the opposite side of the center line 53a (in other words, in an opening/closing direction 14). As a result, the valve body 11 moves to the closed position or the open position. As a result, the outlet 53 is opened/closed by the valve body 11. A rotating direction of the shaft portion 13 for moving the valve body 11 toward the closed position is defined as a close direction. On the other hand, a rotating direction of the shaft portion 13 for moving the valve body 11 toward the open position is defined as an open direction.

A position of an application point of a force applied from the arm member 12 to the valve body 11 at the closed position by the rotation of the shaft portion 13 can be any one of the following three positions. It is assumed that a plurality of forces are applied from the arm member 12 to the valve body 11 when the valve body 11 rotates. In such a case, a position of an application point of a resultant force of these forces may be any one of the following three positions.

(a) The application point is located on the center line 53a side with respect to a reference plane 13d.

(b) The application point is located on the reference plane 13d.

(c) The application point is located on the opposite side of the center line 53a with respect to the reference plane 13d.

The reference plane 13d is a plane parallel to the center line 53a. Further, the reference plane 13d is a plane including the axis 13c.

The position of the connecting portion of the arm member 12 may he adjusted such that (a) is established. In the case of (a), the direction of the force applied from the arm member 12 to the valve body 11 is inclined with respect to the outlet 53. Specifically, for example, the connecting portion may be disposed on the center line 53a side with respect to a portion of the outer surface of the valve body 11 intersecting the reference plane 13d. A connection position 12a in FIG. 2B shows an example of the position of the connection portion in the case of (a). Here, an angle between a straight line connecting the axis 13c and the application point and the reference plane 13d is θ. When the straight line is inclined toward the center line 53a, θ is a positive value, and when the straight line is inclined to the opposite side of the center line 53a, θ is a negative value. In the case of (a), θ>0.

On the other hand, the position of the connecting portion of the arm member 12 may be adjusted such that (b) is established. In the case of (b), the direction of the force applied from the arm member 12 to the valve body 11 is parallel to the outlet 53. Specifically, for example, the connecting portion may be disposed at the portion of the outer surface of the valve body 11 intersecting the reference plane 13d. A connection position 12b in FIG. 2B shows an example of the position of the connection portion in the case of (b). In the case of (b), θ=0.

On the other hand, the position of the connecting portion of the arm member 12 may be adjusted such that (c) is established. In the case of (c), the direction of the force applied from the arm member 12 to the valve body 11 is inclined with respect to the outlet 53. Specifically, for example, the connecting portion may be disposed on the opposite side of the center line 53a with respect to the portion of the outer surface of the valve body 11 intersecting the reference plane 13d. A connection position 12c in FIG. 2B shows an example of the position of the connection portion in the case of (c). In the case of (c), θ<0.

In the present embodiment, as an example, the outlet 53 is orthogonal to the direction of the flow path for exhaust gas inside the cylindrical portion 51 and the exhaust pipe 20. However, even when the outlet 53 is not orthogonal to the direction of the flow path, the position of the connecting portion of the arm member 12 may be similarly adjusted so as to be any one of (a) to (c). In the present embodiment, as an example, the axis 13c is parallel to the outlet 53. However, when the axis 13c and the outlet 53 are substantially parallel to each other, or when the axis 13c and the outlet 53 are not parallel to each other, the position of the connecting portion of the arm member 12 may be similarly adjusted so as to be any one of (a) to (c).

In the valve device 10, the valve body 11 is displaced by a spring and an actuator (not shown) the like. Specifically, a force rotating in the close direction is constantly applied to the shaft portion 13 by the spring (not shown). For this reason, a force for moving toward the closed position is constantly applied to the valve body 11. As a result, the valve body 11 is in a state of being pressed toward the outlet 53 when the outlet 53 is closed. When opening the outlet 53, a force rotating in the open direction is applied to the shaft portion 13 by the actuator (not shown). As a result, the valve body 11 moves from the closed position to the open position.

The position and direction of the axis 13c, the position of the arm member 12, the position of the connecting portion with the valve body 11 in the arm member 12, the open position and closed position of the valve body 11, a trajectory of the valve body 11 at the time of opening/closing the outlet 53, and the like can be calculated using general physics formulas and the like, For example, when the open position and the closed position of the valve body 11 are determined, the position of the axis 13$c$, the position of the arm member 12, and the like can be calculated. At this time, in consideration of a load generated on the arm member 12, the valve body 11, or the like when opening/closing the outlet 53, the above-described position, direction, trajectory of the valve body 11, or the like may be determined.

[Effects]

According to the valve device 10 of the present embodiment, when the outlet 53 is opened/closed, the valve body 11 can be moved so as to be displaced along the outlet 53 while facing the outlet 53. Thus, a hangover can be suppressed. The hangover means the degree to which the trajectory of the valve body 11 opening/closing the outlet 53 projects toward the downstream side of the outlet 53. When the valve body 11 is rotated to the opposite side of the center line 53$a$, the valve body 11 can reach the outlet space 61 on the lateral side of the cylindrical portion 51, That is, when the outlet 53 is opened, the valve body 11 can be accommodated laterally of the outlet 53. Accordingly, it is possible to suppress a space required on the downstream side of the outlet 53 for opening/closing the outlet 53. Thus, arrangement of the valve device 10 becomes easy.

When the shaft portion 13 is rotated in the open direction, it is possible to make all the portions of the valve body 11 located at the closed position separate from the outlet 53. Thus, the outlet 53 can be opened well. On the other hand, when the outlet 53 is closed, the valve body 11 presses the outlet 53 from the downstream side. Thus, the sealing property (in other words, the sealability) of the outlet 53 at the time of closing is improved. On the other hand, when the outlet 53 is opened, the valve body 11 is located laterally of the outlet 53. Thus, the valve body 11 can be prevented from hindering a flow of exhaust gas passing through the outlet 53. In addition, the axis 13$c$ can be disposed near the valve body 11. Thus, it is possible to suppress a force required for rotating the valve body 11 (in other words, a force required for opening/closing the outlet 53). As a result, it is possible to suppress abnormal noise at the time of occurrence of chattering. The chattering is a phenomenon in which during closing of the outlet 53, the outlet 53 is opened/closed by the valve body 11 due to an increase or decrease in air pressure inside the exhaust pipe 20 and the cylindrical portion 51.

Accordingly, the valve device 10 can be easily disposed while well opening/closing the outlet 53.

It is conceivable to adjust the position of the connecting portion with the valve body 11 in the arm member 12 such that the position of the application point of the force from the arm member 12 to the valve body 11 is (a) described above. (a) means that the application point is located on the center line 53$a$ side with respect to the reference plane 13$d$. In this case, when the pressure inside the exhaust pipe 20 and the cylindrical portion 51 rises during closing of the outlet 53, a force for rotating the valve body 11 toward the opposite side of the center line 53$a$ acts on the valve body 11. That is, when the pressure rises during closing of the outlet 53, the outlet 53 is opened. Thus, the valve device 10 can function as a safety valve.

It is conceivable to adjust the position of the connecting portion of the arm member 12 such that the position of the application point is (b) described above. (b) means that the application point is located on the reference plane 13$d$. In this case, even when the pressure inside the exhaust pipe 20 and the cylindrical portion 51 rises during closing of the outlet 53, the force for rotating the valve body 11 does not occur. Thus, even when the pressure rises during closing of the outlet 53, it is easy to maintain the closed state of the outlet 53. Accordingly, the sealing property at the time of closing the outlet 53 is improved.

It is conceivable to adjust the position of the connecting portion of the arm member 12 such that the position of the application point is (c) described above. (c) means that the application point is located on the opposite side of the center line 53$a$ with respect to the reference plane 13$d$. In this case, when the pressure inside the exhaust pipe 20 and the cylindrical portion 51 rises during closing of the outlet 53, a force for rotating the valve body 11 toward the center line 53$a$ acts on the valve body 11. That is, when the pressure rises during closing of the outlet 53, the outlet 53 is closed more strongly. Accordingly, the sealing property at the time of closing the outlet 53 is further improved.

In the present embodiment, when the valve body 11 is rotated to the opposite side of the center line 53$a$, the valve body 11 is disposed in the outlet space 61 located laterally of the cylindrical portion 51. Thus, it is possible to effectively utilize the space around the cylindrical portion 51 and the outlet 53.

[Other Embodiments]

(1) A valve device 10 of the present embodiment is installed in an exhaust heat recovery device 1 provided in an exhaust pipe that causes exhaust gas of a vehicle to flow down. However, the valve device 10 may be used to open/close an opening located at an end of the exhaust pipe for a purpose different from that of the exhaust heat recovery device 1. The valve device 10 may also be used to open/close an opening located at an end portion of a tubular member of a vehicle that causes a fluid other than exhaust gas to flow. The fluid may be a gas or a liquid. The valve device 10 may also be used to open/close an opening located at an end portion of a tubular member for various purposes without limitation to vehicles.

(2) In the valve device 10 of the present embodiment, a force rotating in a close direction is constantly applied to a shaft portion 13 by a spring. Consequently, a force for moving toward a closed position is applied to the valve body 11. When an outlet 53 is opened, a force rotating the shaft portion 13 in an open direction is applied by an actuator. Consequently, the valve body 11 moves toward the open position. As a result, the outlet 53 is opened. However, the present invention is not limited to a method using the spring and the actuator, and the shaft portion 13 may be rotated in the close direction and the open direction by the actuator. The shaft portion 13 may be manually rotated in the close direction or the open direction.

The valve device 10 may be configured as a safety valve. That is, the force rotating the shaft portion 13 in the close direction may be constantly applied by a spring. As a result, the valve body 11 closing the opening located at the end portion of the tubular member is in a state where the opening is constantly pressed. When the pressure inside the tubular member rises, the valve body 11 may spontaneously move toward the open position. In this case, it is preferable to adjust the position of the connecting portion of the arm member 12 such that the position of the application point of the force applied from the arm member 12 to the valve body 11 is (a) described above.

(3) In the valve device 10 of the present embodiment, the arm member 12 is rotated by the first shaft portion 13$a$ and the second shaft portion 13$b$. However, the present invention is not limited to the rotation by the first shaft portion 13$a$ and the second shaft portion 13$b$, and the arm member 12 may be rotated by one of the first shaft portion 13$a$ and the second shaft portion 13$b$.

The arm member 12 is disposed so as to cross the outer surface of the valve body 11. However, the positions of the arm member 12 and the valve body 11 are not limited thereto. For example, the arm member 12 may be connected to an edge portion of the valve body 11. Specifically, for example, the arm member 12 may have a first portion and a second portion that are elongated portions. The first portion connects the first shaft portion 13*a* and an edge portion of the valve body 11 on the first shaft portion 13*a* side. On the other hand, the second portion connects the second shaft portion 13*b* and an edge portion of the valve body 11 on the second shaft portion 13*b* side. One of the first member and the second portion may be used as the arm member 12.

Also in these cases, the application point of the force applied from the arm member 12 to the valve body 11 may be any one of (a) to (c) described above. Even in these cases, by adjusting the position of the connecting portion with the valve body 11 in the arm member 12, the application point can be set to any one of (a) to (c).

(4) It is also conceivable to provide the valve device 10 to a user with the valve body 11 and the arm member 12 separated. Consequently, the position of the connecting portion with the valve body 11 in the arm member 12 can be adjusted depending on the use of the valve device 10 or the like. That is, the position of the application point of the force from the arm member 12 to the valve body 11 can be adjusted.

[Correspondence with Claims]

The correspondence between the terms used in the description of the above embodiments and the terms used in the recitations in the claims is shown.

The outlet 53 corresponds to an example of an opening, the valve body 11 corresponds to an example of a lid portion, the arm member 12 corresponds to an example of an arm portion, the exhaust gas corresponds to an example of a moving fluid, the coolant corresponds to an example of another fluid, and the inflow route 42 corresponds to an example of an opening portion. Further, the cylindrical portion 51 and a portion surrounded laterally by the cylindrical portion 51 in the exhaust pipe 20 correspond to an example of an end section. Furthermore, the direction in which the exhaust pipe 20 and the cylindrical portion 51 extend corresponds to an example of an end direction.

The invention claimed is:

1. A valve device opening and closing an opening, which is located at an end portion of a tubular portion, the valve device comprising:
    a valve body closing the opening; and
    an arm portion arranged on an outside of the tubular portion and rotating the valve body about an axis to open and close the opening,
    wherein a straight line passing through the center of the opening and orthogonal to the opening is a center line,
    the axis is a straight line intersecting the tubular portion without intersecting the center line, and
    when closing the opening, the arm portion rotates the valve body toward the center line, and when opening the opening, the arm portion rotates the valve body to the opposite side of the center line.

2. The valve device according to claim 1, wherein a plane parallel to the center line and including the axis is a reference plane, and
    an application point of a force applied from the arm portion to the valve body in order to rotate the valve body located at a position where the opening is closed is located on the center line side with respect to the reference plane.

3. The valve device according to claim 1, wherein a plane parallel to the center line and including the axis is a reference plane, and
    an application point of a force applied from the arm portion to the valve body in order to rotate the valve body located at a position where the opening is closed is located on the reference plane.

4. The valve device according to claim 1, wherein a plane parallel to the center line and including the axis is a reference plane, and
    an application point of a force applied from the arm portion to the valve body in order to rotate the valve body located at a position where the opening is closed is located on the opposite side of the center line with respect to the reference plane.

5. The valve device according to claim 1, wherein a section comprising the end portion of the tubular portion is an end section,
    the end section is a section extending in a predetermined end direction, the opening is directed toward the end direction,
    a heat exchanger that transmits heat of a moving fluid, which is a fluid flowing through the tubular portion, to another fluid is provided laterally of a section on the upstream side of the end section, and
    when the valve body closes the opening, the moving fluid flows out laterally of the tubular portion from an opening portion provided on the upstream side of the opening, and the moving fluid moves toward the heat exchanger.

6. The valve device according to claim 2, wherein a section comprising the end portion of the tubular portion is an end section,
    the end section is a section extending in a predetermined end direction, the opening is directed toward the end direction,
    a heat exchanger that transmits heat of a moving fluid, which is a fluid flowing through the tubular portion, to another fluid is provided laterally of a section on the upstream side of the end section, and
    when the valve body closes the opening, the moving fluid flows out laterally of the tubular portion from an opening portion provided on the upstream side of the opening, and the moving fluid moves toward the heat exchanger.

7. The valve device according to claim 3, wherein a section comprising the end portion of the tubular portion is an end section,
    the end section is a section extending in a predetermined end direction, the opening is directed toward the end direction,
    a heat exchanger that transmits heat of a moving fluid, which is a fluid flowing through the tubular portion, to another fluid is provided laterally of a section on the upstream side of the end section, and
    when the valve body closes the opening, the moving fluid flows out laterally of the tubular portion from an opening portion provided on the upstream side of the opening, and the moving fluid moves toward the heat exchanger.

8. The valve device according to claim 4, wherein a section comprising the end portion of the tubular portion is an end section,
    the end section is a section extending in a predetermined end direction, the opening is directed toward the end direction, a heat exchanger that transmits heat of a moving fluid, which is a fluid flowing through the tubular portion, to another fluid is provided laterally of a section on the upstream side of the end section, and when the valve body closes the opening, the moving fluid flows out laterally of the tubular portion from an opening portion provided on the upstream side of the opening, and the moving fluid moves toward the heat exchanger.

9. The valve device according to claim 1, wherein the opening has a rotationally symmetrical or a substantially rotationally symmetrical shape.

10. The valve device according to claim 1, wherein the arm portion is configured to rotate the valve body around the axis and displace the valve body along the opening to open and close the opening.

11. The valve device according to claim 10, wherein the arm portion is configured to displace the valve body to a lateral side of the tubular portion to open the opening.

12. The valve device according to claim 1, wherein, when being located in a position to close the opening, the arm portion is configured to extend from the axis towards the opening along an outer periphery of the tubular portion.

* * * * *